(12) United States Patent
Arambepola et al.

(10) Patent No.: US 9,106,497 B2
(45) Date of Patent: Aug. 11, 2015

(54) APPARATUS AND METHOD FOR IMPROVING OFDM RECEIVER PERFORMANCE IN THE PRESENCE OF NARROWBAND INTERFERERS

(75) Inventors: Bernard Arambepola, Enfield (GB); Thushara Hewavithana, Hatfield (GB)

(73) Assignee: Intel Corporation, Santa Clara, CA (US)

( * ) Notice: Subject to any disclaimer, the term of this patent is extended or adjusted under 35 U.S.C. 154(b) by 98 days.

(21) Appl. No.: 13/596,993

(22) Filed: Aug. 28, 2012

(65) Prior Publication Data

US 2014/0064419 A1  Mar. 6, 2014

(51) Int. Cl.
| | |
|---|---|
| *H04L 25/08* | (2006.01) |
| *H04L 1/00* | (2006.01) |
| *H04B 1/10* | (2006.01) |
| *H04L 27/26* | (2006.01) |
| *H03K 6/04* | (2006.01) |
| *H03K 5/01* | (2006.01) |
| *H03D 1/06* | (2006.01) |
| *H03D 1/04* | (2006.01) |

(52) U.S. Cl.
CPC .......... *H04L 27/265* (2013.01); *H04L 27/2657* (2013.01); *H04L 27/2688* (2013.01); *H04L 27/2691* (2013.01)

(58) Field of Classification Search
CPC ............ H04L 27/2647; H04L 27/2332; H04L 2027/003; H04L 25/067; H04L 1/0045; H04L 5/0007; H04L 27/38; H04L 27/2657; H04L 27/2688; H04L 27/2691; H04B 1/1027; H04B 1/123

USPC ......... 375/229, 232, 233, 260, 316, 324, 340, 375/346

See application file for complete search history.

(56) References Cited

U.S. PATENT DOCUMENTS

| 2006/0133527 | A1* | 6/2006 | Yu et al. ........................ 375/260 |
| 2007/0009011 | A1* | 1/2007 | Coulson ........................ 375/144 |

(Continued)

FOREIGN PATENT DOCUMENTS

WO  WO-2014035519 A1  3/2014

OTHER PUBLICATIONS

"International Application Serial No. PCT/US2013/044701, International Search Report mailed Nov. 13, 2013", 3 pgs.

(Continued)

*Primary Examiner* — Ted Wang
(74) *Attorney, Agent, or Firm* — Schwegman Lundberg & Woessner, P.A.

(57) ABSTRACT

In an Orthogonal Frequency Division Multiplex ("OFDM") system, the problem of an interferer reducing the signal-to-noise ratio of a signal can be mitigated by generating an interferer-correction signal and subtracting it from the signal to be processed. The amplitude, frequency and phase of the interferences are determined first. The frequency is estimated by averaging the squared-magnitude of multiple FFTs of the incoming signal and then locating the spectral peaks. The phase and amplitude may be estimated from this FFT outputs or through a process of correlation in the time domain. The interferer-correction signal is generated from the estimated amplitude, frequency, and phase. The correction to be subtracted from the main signal in order to reduce the effect of the interference may be generated in the time or frequency domain. The subtraction of the correction may also be implemented in the time or frequency domains.

28 Claims, 5 Drawing Sheets

(56) References Cited

U.S. PATENT DOCUMENTS

| | | |
|---|---|---|
| 2007/0201351 A1* | 8/2007 | Egashira et al. .............. 370/208 |
| 2008/0247480 A1 | 10/2008 | Ionescu et al. |
| 2009/0161804 A1 | 6/2009 | Chrabieh et al. |
| 2010/0118849 A1 | 5/2010 | Kimura |
| 2010/0226356 A1 | 9/2010 | Sahin et al. |
| 2012/0214524 A1* | 8/2012 | Wajcer et al. .................. 455/502 |

OTHER PUBLICATIONS

"International Application Serial No. PCT/US2013/044701, Written Opinion mailed Nov. 13, 2013", 4 pgs.

* cited by examiner

APPARATUS AND METHOD FOR IMPROVING OFDM RECEIVER PERFORMANCE IN THE PRESENCE OF NARROWBAND INTERFERERS

TECHNICAL FIELD

Embodiments pertain to orthogonal frequency division multiplexed (OFDM) communications.

BACKGROUND ART

Orthogonal frequency division multiplexing (OFDM) is an increasingly common method of modulating digital data on multiple carrier frequencies, being used in both wired and wireless transmissions to increase the transmission rate of signals. OFDM is used in many different applications, including, but not limited to, digital television, audio broadcasting, broadband Internet access, wireless networks, and 4G/LTE mobile communications. As more information becomes transmitted using OFDM modulation, it becomes more common for OFDM signals to encounter interference, which negatively impacts transmission rate. Thus, there are general needs to overcome such interference.

BRIEF DESCRIPTION OF THE DRAWINGS

The subject matter regarded as the invention is particularly pointed and distinctly claimed in the concluding portion of the specification. The invention, however, both as to organization and method of operation, together with objects, features, and advantages, may best be understood by reference to the following detailed description when read with the accompanying drawings, in which:

DESCRIPTION OF THE EMBODIMENTS

The following description and the drawings sufficiently illustrate specific embodiments to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments set forth in the claims encompass all available equivalents of those claims.

In the following detailed description, numerous specific details are set forth in order to provide a thorough understanding of the invention. However, it will be understood by those skilled in the art that the present invention may be practiced without these specific details. In other instances, well-known method, procedures, components, and circuits have not been described in detail so as not to obscure the present invention.

Although embodiments of the invention are not limited in this regard, the terms "plurality" and "a plurality" as used herein may include, for example, "multiple" or "two or more." The terms "plurality" or "a plurality" may be used throughout the specification to describe two or more components, devices, elements, units, parameters, and the like. For example, "a plurality of stations" may include two or more stations.

The presence of high-power, narrow-band interferers can be common in any form of signal transmission. When present in a system that uses orthogonal frequency division multiplexing ("OFDM") modulation, these narrow-band interference signals can impact many carriers in the vicinity of the interfering signal. Narrow-band interference may be caused by other signals being transmitted over the same channel.

Figure 1:
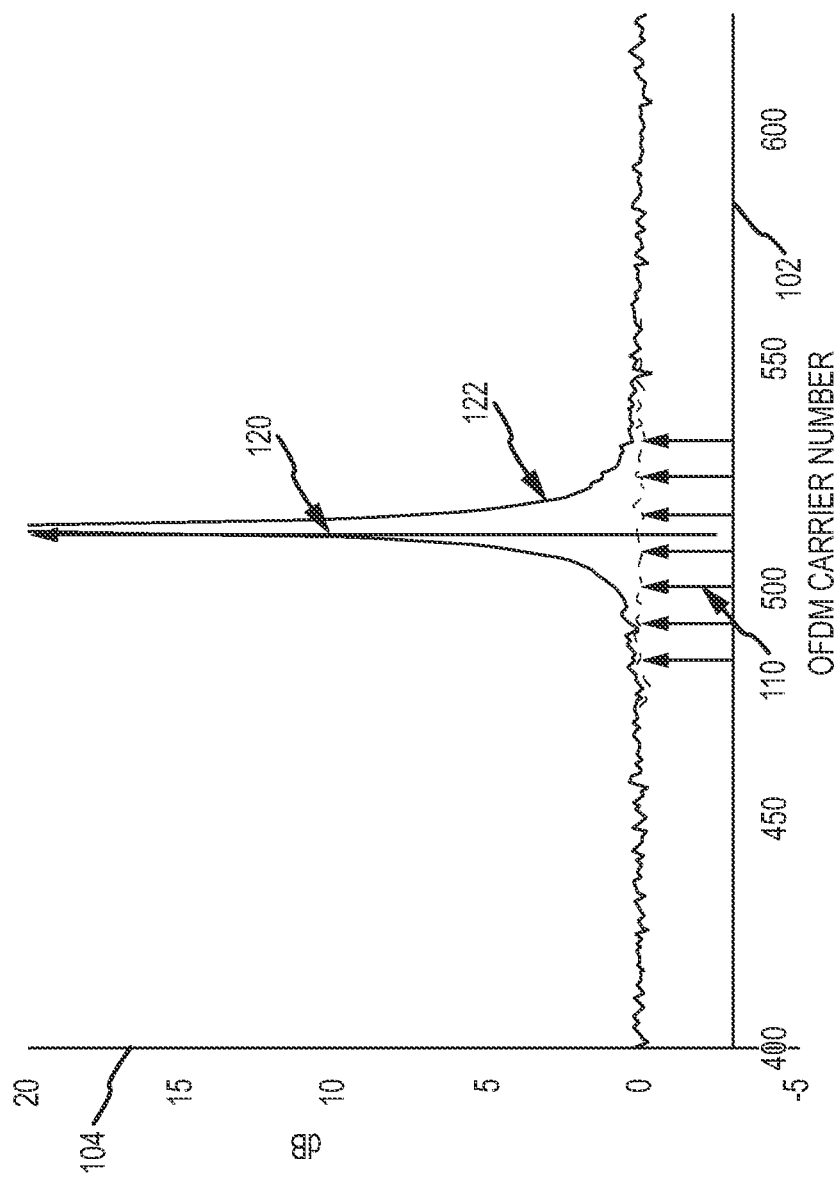
FIG. 1 is a graph illustrating the effect of an interferer.

FIG. 1 is an illustration of the effect of a narrow-band interferer. Graph 100 plots frequency in terms of OFDM sub-carrier indices on the x-axis 102 and amplitude on y-axis 104. There are OFDM carriers 110 at a variety of frequencies. When an interferer 120 is present, it does not seem that it would affect neighboring frequencies. However, OFDM signal processing involves taking the Discrete Fourier Transform (DFT) of finite segments of received data samples, which is equivalent to applying a rectangular window to the narrowband interference 120 prior to DFT. So unless the frequency of the interference 120 coincides with an OFDM sub-carrier frequency, the effect of the interference would spread over many adjacent OFDM sub-carriers, as shown in FIG. 1. The number of sub-carriers seriously affected by this spread depends on the power of the interference source. As a result, interferer 120 affects multiple carriers 110 via sidelobes 122. The result is a substantial performance loss.

Although only one interferer 120 is shown in FIG. 1, it should be understood that multiple interferers are also possible. In addition, although it is possible to detect that OFDM signals 110 have been corrupted, and apply error correction to the corrupted signals, there is still a substantial impact to performance, because of the additional error correction that must be applied.

Figure 2:
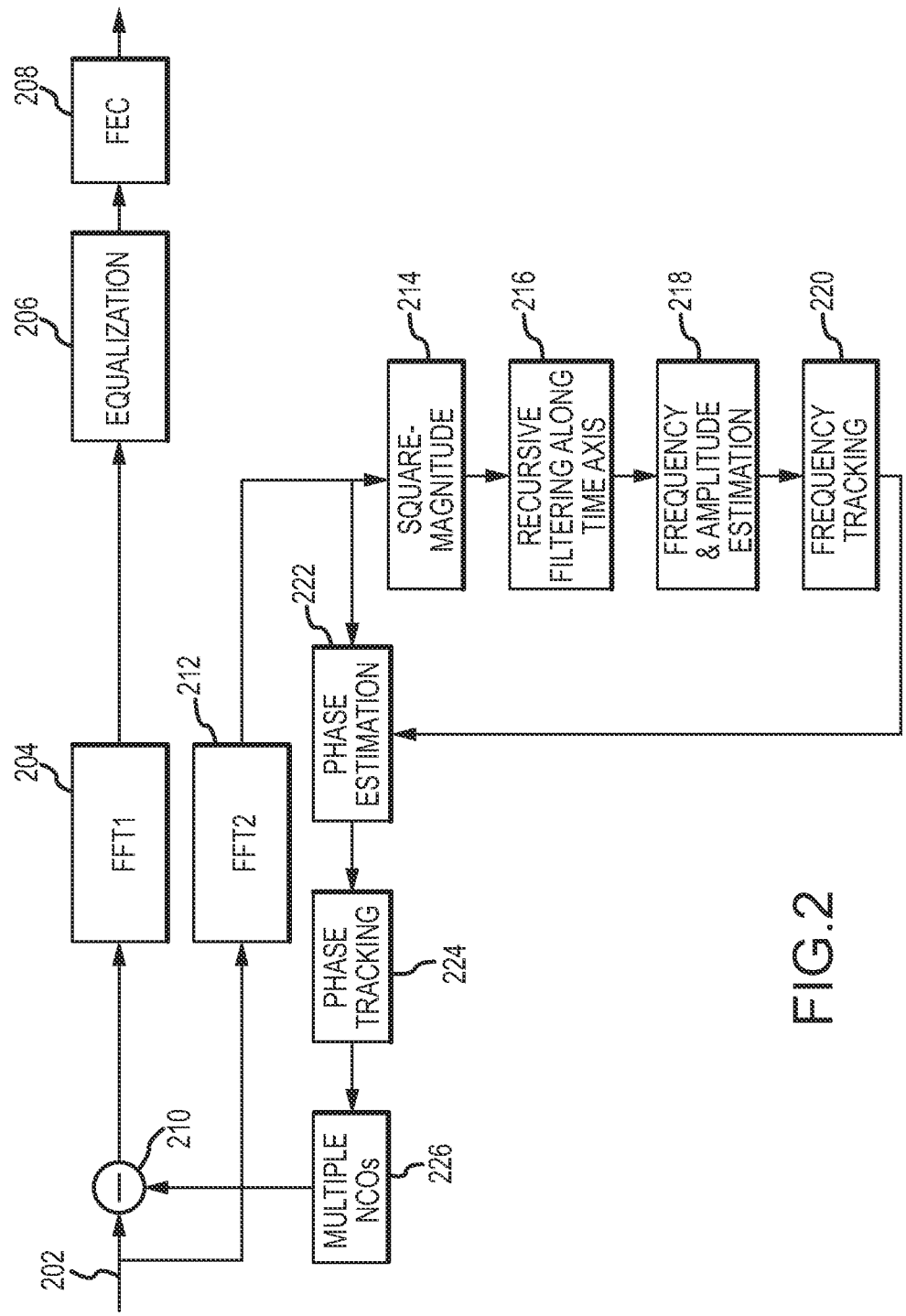
FIG. 2 is a block diagram illustrating an embodiment of the present invention.

One possible solution to this problem is illustrated in FIG. 2. FIG. 2 shows the processing path through one possible embodiment. The top signal path can be thought of as an OFDM processor. The top signal path shows signal 202 progressing through a Fast Fourier Transform 1 ("FFT1") block 204, then gets equalized via equalization block 206. It should be understood that the parameters of FFT1 might vary and not affect the operation of an embodiment of this invention. Thereafter, the signal goes through Forward Error Correction block 208. The output of Forward Error Correction block 208 is transmitted to the next stage, which may be an MPEG transport stream carrying audio, video, and data.

However, before input signal 202 is processed, there is a parallel signal path that also processes input signal 202 to generate an interferer-correction signal. This interferer-correction signal is subtracted from incoming signal 202 at block 210, prior to processing by FFT1 block 204.

The estimated interferer signal is generated in the following manner. Incoming signal 202 travels to FFT2 block 212, which calculates a second FFT. In some embodiments, the length of FFT2 is taken to be the same as that of FFT1. However, in other embodiments, a different length may be chosen. A longer FFT2 may be used here to get a better frequency resolution, but this may increase the computational complexity. The squared magnitude of the frequency domain signal is then computed in block 214 and is subjected to time filtering in block 216. Because the interferer signal is a slow-varying process compared to the OFDM symbol rate, the interferer signal will appear at approximately the same frequency in several successive FFTs and the time filtering will help to amplify this with respect to the randomized data signal that makes up the background. Time filtering may be implemented through an averaging process over a number of FFTs.

$$Q(k, i) = (1/M) \sum_{j=0}^{M-1} P(k-j, i)$$

This equation averages the past M square-magnitudes of the FFTs P(k,i) to give the averaged estimate Q(k,i). Here k is the time index and i is the frequency index. This averaging is quite expensive in computations and storage. Hence, a simpler recursive averaging operation may be employed:

$$Q(k,i) = (1-\alpha)Q(k-1,i) + \alpha P(k,i), \text{ where } \alpha < 1.$$

This is merely one example of a recursive averaging low-pass filter in the time dimension. It should be understood that other methods might also be used.

The amplitude-frequency pairs $$\{(A_i, F_i), \text{ for } i \in S\}$$

are estimated from this time filtered frequency domain signal at block 218. The frequency of the interferer may or may not necessarily coincide with the frequency of an OFDM carrier. Hence, the above-mentioned estimation will require the solution of a set of simultaneous equations using a numerical and iterative algorithm. For this reason, the number of interferers has to be first estimated. In one embodiment, such an estimate may be calculated using an adaptive threshold. The average power of the OFDM carriers is worked out from Q(k,i). This average $\overline{Q(k,i)}$ is then refined by calculating a second average $\overline{Q(k,i)}$ excluding the values of Q(k,i) that exceed Th1*$\overline{Q(k,i)}$. Then the values Q(k,i) that do not exceed Th2*$\overline{Q(k,i)}$ are set to zero. Here, Th1 and Th2 are parameters greater than unity. Then the number of clusters is estimated as the number of sets of consecutive non-zero samples in the signal. Each cluster would correspond to a spectral spread of an interferer. The number of such clusters will indicate the number of interferers. Within each cluster the frequency of the interference may be estimated, for example, by fitting a sin c(x) function to the amplitudes of the samples of the cluster. This may be approximated through linear interpolation of the two largest successive samples within a cluster, i.e., if the largest sample value is $M_0$ and the next largest to the right or left of this is $M_1$ then the frequency of the interference may be taken as the frequency between $M_0$ and $M_1$ and dividing this frequency segment to the ratio $M_0$:$M_1$. The number of strong interferences will usually be very small. Hence, it has been assumed in the description above that clusters are non-overlapping. However, if two clusters overlap the sin c(x) types of spectral spreads of the clusters too will overlap and hence it will be necessary to solve simultaneous equations to extract the two frequencies.

Subsequently, each of the frequency-amplitude pairs (Ai, Fi) is tracked for variations over time at block 220, using an adaptive linear predictive algorithm since the interferer may be frequency and amplitude modulated by a signal that is slow-varying with respect to the OFDM signal. This tracking will enable the system to track these relatively slow variations and also to smooth out and thereby reduce the noise content in parameter estimates.

Linear prediction may be performed using $$F_i^P = \sum_{j=1}^{M} \alpha_j F_{i-j}$$

This will give a frequency prediction to the next data block. When the next data block arrives and its frequency is estimated then a frequency error $\Delta F = F_i - F_i^P$ may be formed. This frequency error may be used to update the tracking coefficients $\{\alpha_j\}$ using the least mean square (LMS) algorithm.

This amplitude-frequency pair $(A_i, F_i)$ is then used to estimate the phase of each interferer from the complex frequency domain signal at the output of FFT2, at block 222.

Phase can be estimated in a variety of different manners. In one embodiment, phase is estimated using the FFT samples $X_k$ in the immediate neighborhood U of the interferer frequency $F_i$.

$$\text{phase}\left\{\sum_{k \in U} X_k \exp(-j\pi(F_i - F_k)(N-1)T) \text{sign}\left\{\frac{\sin(\pi(F_i - F_k)NT)}{\sin(\pi(F_i - F_k)T)}\right\}\right\}$$

The phase estimate may be noisy and possibly time varying. Therefore, the phase estimate has to be filtered and tracked over time at block 224. This will give a set of triplets per interferer:

$$\{(A_i, F_i, \Phi_i), \text{ for } i \in S\}.$$

Typically, this set will have one, two, or three elements. These are passed to a set of numerically controlled oscillators (NCOs) 226 to generate an interferer-correction signal that serves to cancel out the interferer signal when subtracted from the incoming signal. The samples of a specific interferer are $$A_i \exp(j(2\pi F_i(nT) + \Phi_i)), \text{ for } n = 0, 1, 2, \ldots, N-1$$

where T is the sampling period and N the length of the FFT. So the NCO will first accumulate ($F_i T$) modulo 1.0 to get a sequence of samples, each in the range 0 to 1.0. It will send this sequence to a look-up table or another trigonometric function generator to get the real and the imaginary parts (cosine and sine values) of a complex sequence, which will be multiplied by $A_i \exp(j\Phi_i)$ needed to generate the complex exponential function of the above equation.

Figure 3:
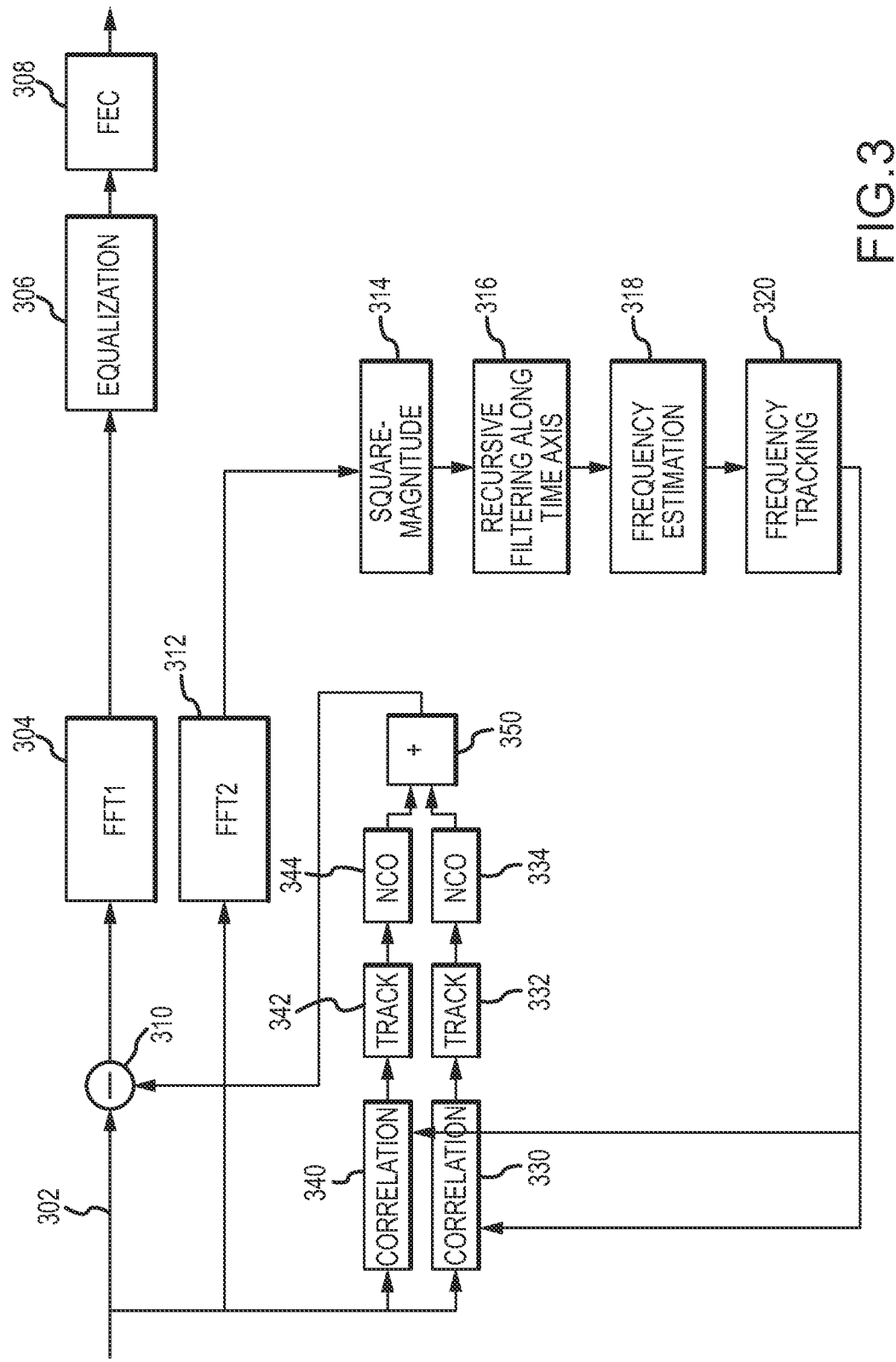
FIG. 3 is a block diagram illustrating another embodiment of the present invention.

An alternative embodiment is illustrated in FIG. 3. One of the signals paths is similar to that of FIG. 2, comprising FFT1 block 304, equalization block 306 and forward error correction block 308. However, before input signal 302 is processed, an interferer-correction signal is subtracted from it.

The second signal path uses time-domain correlation to obtain the phase of the interferer(s) and then track the phase over time using an adaptive linear predictive algorithm. The second signal path calculates a second Fast Fourier Transform at FFT2 block 312. The square magnitude of the frequency domain signal is then computed in block 314. Thereafter, the signal is subjected to time filtering using a recursive filter in Recursive Filter block 316. The frequencies of the interferences are determined in block 318. This frequency is tracked in block 320 in a manner similar to block 220 in FIG. 2.

However, unlike in FIG. 2, in FIG. 3 the frequency and amplitude of the tone interference are estimated using a time-domain correlation in block 340. This shows two correlation boxes 340 for the two sources of interference, but there could be more depending on the number of interferers. The input signal may be represented as given below:

$$s(nT)=x(nT)+A_1\exp(j(2\pi F_1 nT+\Phi_1))+A_2\exp(j(2\pi F_2 nT+\Phi_2))$$

Here T is the sampling interval and x(nT) is the OFDM signal. The other two terms in the right hand side are the two interferers, frequencies of which have been estimated in the frequency domain as described earlier. Two correlations are carried out in the time domain to determine the amplitudes $A_1$ and $A_2$, and the phase angles $\Phi_1$ and $\Phi_2$. The reference signal for the two correlations are $\{\exp(-j2\pi F_1 nT)\}$ and $\{\exp(-j2\pi F_1 nT)\}$. The correlations give $$\sum_{n=1}^{M} s(nT)\exp(-j2\pi F_1 nT) = MA_1\exp(j\Phi_1) + \text{Noise}$$

$$\sum_{n=1}^{M} s(nT)\exp(-j2\pi F_2 nT) = MA_2\exp(j\Phi_2) + \text{Noise}$$

One term in the right hand side of the equation for s(nT) gets integrated coherently whilst the other two terms are summed incoherently and contributes as background noise terms in the above two equations. These noise terms become negligibly small when the period M of integration is large. Therefore the correlation outputs are equal to $A_1 \exp(j\Phi_1)$ and $A_2 \exp(j\Phi_2)$. From each of these the N samples of the interfering signal for subtraction may be estimated in the NCO boxes 334 and 344, as described earlier with reference to box 226. It is not necessary to extract amplitude and phase from the expressions $A_1 \exp(j\Phi_1)$ and $A_2 \exp(j\Phi_2)$ because these can be used directly to get the estimates of the two interfering signals. These estimates of the interferences have to be added together in box 350 before subtraction. This can be generalized to any number of interferences.

This interferer correction signal is subtracted from the incoming signal 302. The result is passed to FFT1 block 304.

Figure 4:
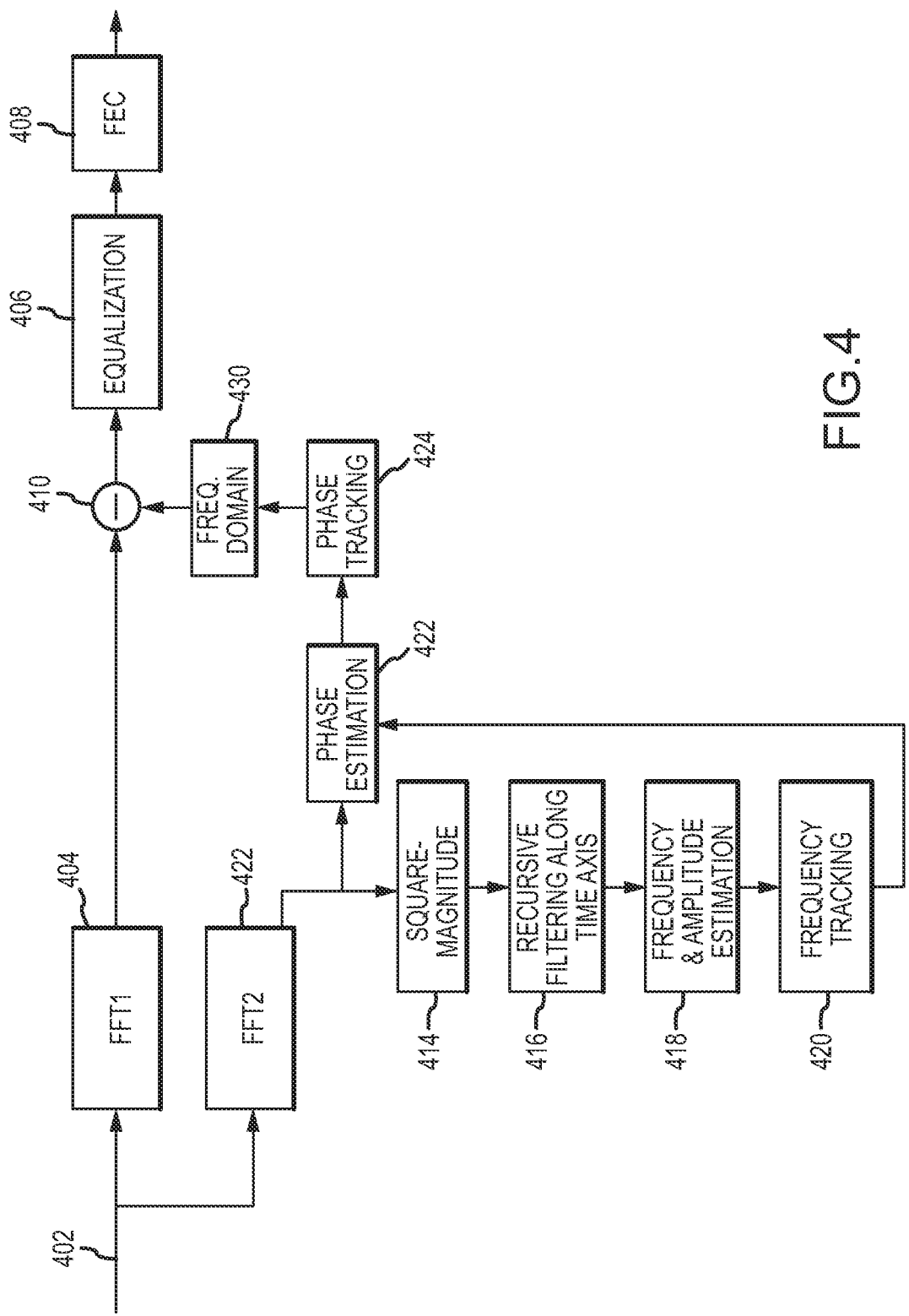
FIG. 4 is a block diagram illustrating another embodiment of the present invention.

The embodiments shown in FIG. 2 and FIG. 3 generate an interferer-correction signal in the time domain. The interferer-correction signal may also be generated in the frequency domain. An embodiment showing such a calculation performed in the frequency domain is illustrated in FIG. 4.

One of the signals paths is similar to that of FIG. 2, comprising FFT1 block 404, equalization block 406 and forward error correction block 408.

There is a parallel signal path that also processes signal 402. This path includes FFT2 block 412 that calculates a second FFT. The magnitude of the frequency domain signal is then computed in Square-Magnitude block 414. Thereafter, the signal is subjected to time filtering using a recursive filter in Recursive Filter block 416. The frequency and amplitude of the signal is estimated in block 418. Frequency tracking block 420 is used to track the frequency variations of the interferer. The interferer may have phase modulation, thus the phase is estimated in block 422 and tracked in block 424, in a manner similar to that described above with reference to FIG. 2. This gives a sequence of triplets $\{(A_i, F_i, \Phi_i), \text{ for } i \in S\}$ corresponding to the interferers. It may be noted that the amplitude and phase of the interference signals can also be generated using the time domain correlation method illustrated in FIG. 3.

After calculating the set of triplets $\{(A_i, F_i, \Phi_i), \text{ for } i \in S\}$, the corresponding frequency domain representation of the interference may be computed in block 430 using the following equation:

$$\sum A_i \exp(j\Phi_i)\exp(j\pi(F_i - F_k)(N-1)T)\frac{\sin(\pi(f_i - F_k)NT)}{\sin(\pi(F_i - F_k)T)}$$

where $F_k$, k=0, 1, ..., N-1, are the OFDM sub-carrier frequencies.

Alternatively, an N-point FFT may be implemented on the time domain signal computed from the triplets $\{(A_i, F_i, \Phi_i), \text{ for } i \in S\}$.

Thereafter, the result is an interferer-correction signal that is subtracted from the result of FFT1 in block 410. The result is equalized in block 406 and a forward error correction is performed in block 408.

Figure 5:
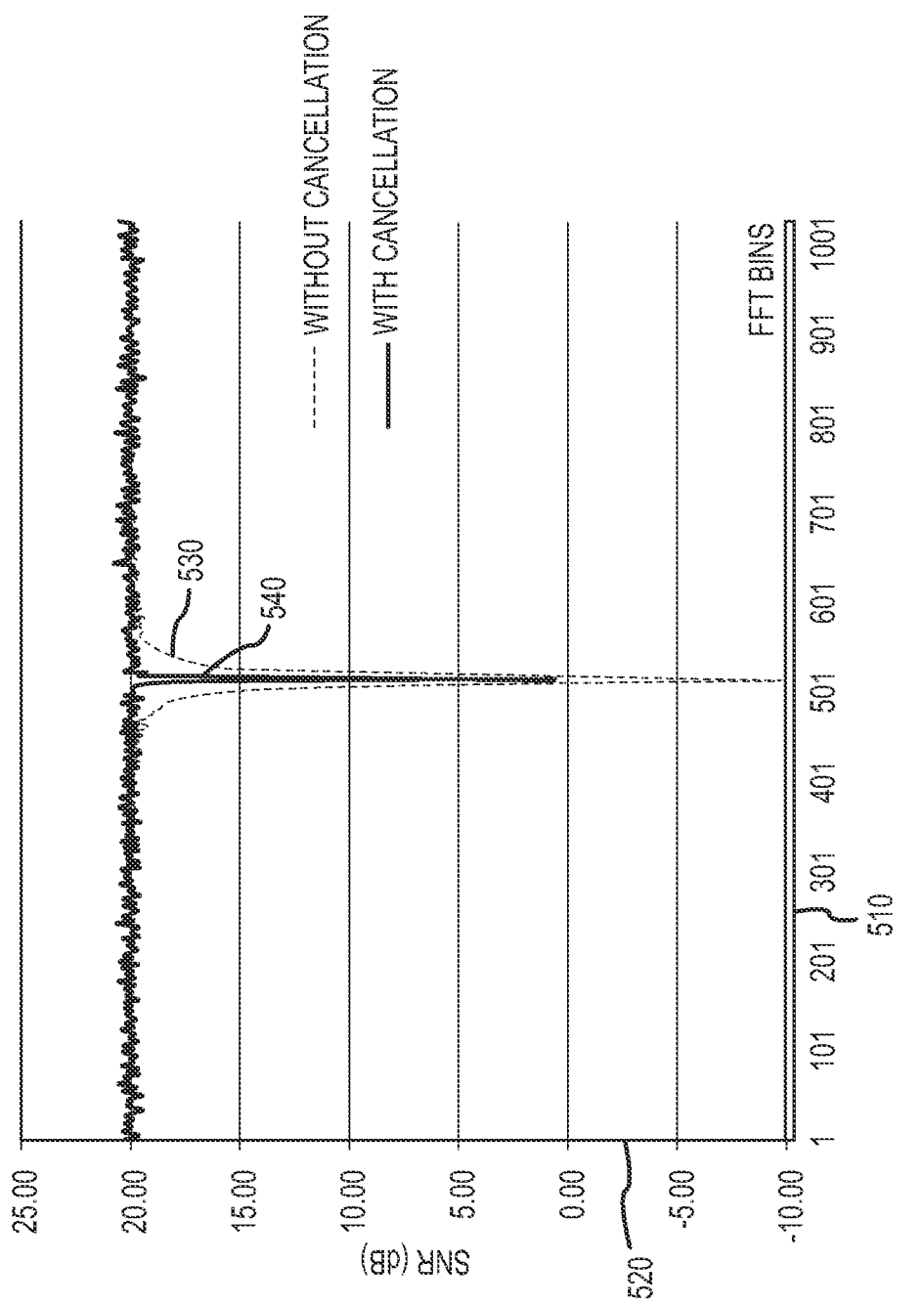
FIG. 5 illustrates the results of a simulation of an embodiment of the present invention.

The use of embodiments of the present invention results in a better Signal-to-Noise ratio (SNR). FIG. 5 shows the results of a simulation of an embodiment of the present invention. In FIG. 5, an FFT length of 1024 has been chosen and the interferer signal has been placed at frequency 512.2, where the sub-carrier separation is taken as the unit of frequency. In this example, the power of the interferer signal is chosen to be equal to the power of the OFDM signal. Gaussian noise has been added to give an SNR of 20 dB. X-axis 510 represents the FFT bin for which the estimate is given. Y-axis 520 is the SNR of the signal. Dotted line 530 is the plot for the signal with no correction being performed. Solid line 540 is the plot for the signal with the interferer-correction signal being calculated and subtracted from the input signal before processing.

In FIG. 5, the SNR of each OFDM carrier has been plotted. Far away from the interference, the SNR is 20 dB. Closer to the interference signal, the SNR begins to drop. As the FFT bin gets closer and closer to the interferer, the SNR drops significantly. Very close to the FFT bin, the SNR is below 0 dB and the signal is very degraded. In total, the SNR of more than 300 carriers were significantly affected by the interference.

In contrast, the signal with the correction applied is much less affected by the interference signal. In fact, only twelve carriers are affected by the interference, a significant improvement over the 300 carriers affected without the correction. Even in the carriers most affected by the interference, the SNR remains above 0 dB, so there is a greater likelihood of being able to process such a signal at the other end of the channel.

Embodiments of the present invention may be used in any type of system that uses OFDM communication. Exemplary systems that use OFDM communications include both wired and wireless systems. An exemplary wired system is a cable internet. An embodiment of the present invention may be present in a cable gateway. An exemplary wireless system includes a Long Term Evolution (LTE) system.

The 3rd Generation Partnership Project (3GPP) is a collaboration agreement established in December 1998 to bring together a number of telecommunications standards bodies, known as "Organizational Partners," that currently include the Association of Radio Industries and Business (ARIB), the China Communications Standards Association (CCSA), the European Telecommunications Standards Institute (ETSI), the Alliance for Telecommunications Industry Solutions (ATIS), the Telecommunications Technology Association (TTA), and the Telecommunication Technology Committee (TTC). The establishment of 3GPP was formalized in December 1998 by the signing of the "The 3rd Generation Partnership Project Agreement."

3GPP provides globally applicable standards as Technical Specifications and Technical Reports for a 3rd Generation Mobile System based on evolved GSM core networks and radio access technologies that they support (e.g., Universal Terrestrial Radio Access (UTRA) for both Frequency Division Duplex (FDD) and Time Division Duplex (TDD) modes). 3GPP also provides standards for maintenance and development of the Global System for Mobile communication (GSM) as Technical Specifications and Technical Reports including evolved radio access technologies (e.g., General Packet Radio Service (GPRS) and Enhanced Data rates for GSM Evolution (EDGE)). Technical Specifications for current standards related to mobile telephony are generally available to the public from the 3GPP organization.

3GPP is currently studying the evolution of the 3G Mobile System and considers contributions (views and proposals) directed toward the evolution of the UTRA Network (UTRAN). A set of high-level requirements was identified by 3GPP workshops including: reduced cost per bit; increased service provisioning (i.e., more services at lower cost with better quality); flexibility of use of existing and new frequency bands; simplified architecture with open interfaces; and reduced/reasonable terminal power consumption. A study on the UTRA & UTRAN Long Term Evolution (UTRAN-LTE, also known as 3GPP-LTE and E-UTRA) was started in December 2004 with the objective to develop a framework for the evolution of the 3GPP radio-access technology towards a high-data-rate, low-latency and packet-optimized radio-access technology. The study considered modifications to the radio-interface physical layer (downlink and uplink) such as means to support flexible transmission bandwidth up to 20 MHz, introduction of new transmission schemes, and advanced multi-antenna technologies.

3GPP-LTE is based on a radio-interface incorporating orthogonal frequency division multiplex (OFDM) techniques. OFDM is a digital multi-carrier modulation format that uses a large number of closely-spaced orthogonal subcarriers to carry respective user data channels. Each subcarrier is modulated with a conventional modulation scheme, such as quadrature amplitude modulation (QAM), at a (relatively) low symbol rate when compared to the radio frequency (RF) transmission rate. In practice, OFDM signals are generated using the fast Fourier transform (FFT) algorithm.

Consequently, in a 3GPP-LTE transmitter, user data is error encoded, mapped into a symbol constellation, reference pilot signals added, and a serial-to-parallel conversion applied to group the multiplexed symbols/reference pilots into sets of tones (in the frequency domain). An N-point inverse fast Fourier transform (IFFT) is applied to each set, where the integer size, N, of the N-point IFFT depends on the number of OFDM channels. The output of the IFFT is a set of complex time-domain samples. A parallel-to-serial conversion is applied to this time-domain sample stream before conversion from the digital domain to analog domain by a digital-to-analog converter (DAC). The DAC is clocked at the FFT sampling rate of the IFFT. The analog signal is then modulated and transmitted through the wireless medium.

In a 3GPP-LTE system, the element that communicates directly with the mobile handsets is commonly referred to as an evolved Node B. This term may be abbreviated as eNodeB or eNB. The mobile handset is commonly referred to as user equipment or a UE. It should be understood, however, that a UE, in addition to being in the form of a mobile handset, may also be a laptop computer, a tablet, an e-reader, or any other device.

The following examples pertain to further embodiments.

A method for reducing the effect of one or more interferer signals in an OFDM system may comprise the following: calculating a first FFT of an incoming signal; estimating a frequency of said one or more interferer signals in the incoming signal using the first FFT of the incoming signal; estimating an amplitude of said one or more interferer signals in the incoming signal using the first FFT of the incoming signal; estimating a phase of said one or more interferer signals in the incoming signal using the first FFT of the incoming signal; generating an interferer-correction signal based on the estimated frequency, amplitude, and phase; and using the interferer-correction signal to reduce the effect of the one or more interferer signals.

In other embodiments using the interferer-correction signal may comprise subtracting the interferer-correction signal from the incoming signal to create a resulting signal; performing a second FFT on the resulting signal after subtraction of the interferer-correction signal; and forwarding the signal from the second FFT for subsequent OFDM processing.

In other embodiment, estimating the frequency of one or more interferer signals may comprise: calculating the squared-magnitude of the FFT; and averaging the calculated squared-magnitude with one or more preceding FFTs by applying a non-recursive or recursive filter. Estimating the frequency of one or more interferer signals may further comprise: estimating the number of interferer signals; and estimating the frequency for each of the interferer signals. Generating an interferer-correction signal may further comprise using an adaptive linear predictive algorithm to track the estimated frequency. Generating an interferer-correction signal may further comprise: estimating the amplitude for each of the interferer signals in the frequency domain; and estimating the phase of each estimated frequency/amplitude pair in the frequency domain. Generating an interferer-correction signal may further comprise: creating an individual interference-correction signal for each frequency/amplitude/phase triplet of each interferer signal in the time domain using a numerically controlled oscillator, creating the interference-correction signal in the time domain by summing the individual interference correction signals. Generating an interferer-correction signal may further comprise: creating an individual interference-correction signal for each frequency/amplitude/phase triplets of each interferer signal in the frequency domain; and creating the interference-correction signal in the frequency domain by summing individual interference-correction signals in the frequency domain. Using the interferer-correction signal may further comprise: subtracting the interference-correction signal from the first FFT to create a resulting signal; and forwarding the resulting signal for subsequent OFDM processing. Generating an interferer-correction signal may further comprise: creating an individual interference-correction signal for each frequency/amplitude/phase triplets of each interferer signal in the frequency domain; and creating the interference-correction signal in the frequency domain by summing individual interference correction signals in the frequency domain. Using the interferer-correction signal may comprise: computing a second FFT of the incoming signal; subtracting the composite frequency domain interference-correction signal from the second FFT to create a resulting signal; and forwarding the resulting signal for subsequent OFDM processing.

In other embodiments, generating an interferer-correction signal may further comprise: estimating the amplitude of each of the interferer signals using time-domain correlation; and estimating the phase of each of the interferer signals using time-domain correlation. Generating an interferer-correction signal may further comprise: creating an interference-correction signal for each frequency/amplitude/phase triplet of each interferer signal in the time domain using a numerically controlled oscillator; and creating the composite interference-correction signal in the time domain by summing the individual interference correction signals.

In other embodiments, generating an interferer-correction signal may further comprise: creating an interference-correction signal for each frequency/amplitude/phase triplets of each interference in the frequency domain; and creating the composite interference-correction signal in the frequency domain by summing individual interference correction signals in the frequency domain. In other embodiments, using the interferer-correction signal comprises: subtracting the composite frequency domain interference-correction signal from the first FFT to create a resulting signal; and forwarding the resulting signal for subsequent OFDM processing. In other embodiments, generating an interferer-correction signal further comprises: creating an interference-correction signal for each frequency/amplitude/phase triplets of each interference in the frequency domain; and creating the composite interference-correction signal in the frequency domain by summing individual interference correction signals in the frequency domain. In other embodiments, using the interferer-correction signal may comprise: computing a second FFT of the incoming signal; subtracting the composite frequency domain interference-correction signal from the second FFT to create a resulting signal; and forwarding the resulting signal for subsequent OFDM processing.

In some embodiments, an apparatus arranged to reduce the effect of one or more interferer signals in an OFDM system may comprise: a first processor arranged to calculate a first FFT of an incoming signal; an estimator arranged to estimate the frequency of said one or more interferer signals in the incoming signal using the first FFT of the incoming signal; a generator arranged to generate an interferer-correction signal; and a second processor arranged to using the interferer-correction signal to reduce the effect of the one or more interferer signals. The estimator may be further arranged to estimate the amplitude of said one or more interferer signals in the incoming signal using the first FFT of the incoming signal. The estimator may be further arranged to estimate the phase of said one or more interferer signals in the incoming signal using the first FFT of the incoming signal.

In some embodiments, the second processor comprises: a subtractor arranged to subtract the interferer-correction signal from the incoming signal to create a resulting signal; a transformer arranged to performing a second FFT on the resulting signal after subtraction of the interferer-correction signal; and a forwarder arranged to forward the signal from the second FFT for subsequent OFDM processing.

The estimator may further comprise: a calculator arranged to calculate the squared-magnitude of the FFT; and an averager arranged to average the calculated squared-magnitude with one or more preceding FFTs by applying a non-recursive or recursive filter. The estimator may be further arranged to estimate the number of interferer signals; and the estimator is further arranged to estimate the frequency of each of the interferer signals.

In some embodiments, the generator is further arranged to: estimate the amplitude of each of the interferer signals in the frequency domain; estimate the phase of each estimated frequency/amplitude pair in the frequency domain. The generator may be further arranged to: create an individual interference-correction signal for each frequency/amplitude/phase triplet of each interferer signal in the time domain using a numerically controlled oscillator; create the interference-correction signal in the time domain by summing the individual interference correction signals.

In some embodiments, the generator is further arranged to: create an individual interference-correction signal for each frequency/amplitude/phase triplets of each interferer signal in the frequency domain; and create the interference-correction signal in the frequency domain by summing individual interference-correction signals in the frequency domain. The second processor may be further arranged to: subtract the interference-correction signal from the first FFT to create a resulting signal; and forward the resulting signal for subsequent OFDM processing.

In some embodiments, the generator may be further arranged to: create an individual interference-correction signal for each frequency/amplitude/phase triplets of each interferer signal in the frequency domain; and create the interference-correction signal in the frequency domain by summing individual interference correction signals in the frequency domain. The second processor may be further arranged to: compute a second FFT of the incoming signal; subtract the composite frequency domain interference-correction signal from the second FFT to create a resulting signal; and forward the resulting signal for subsequent OFDM processing.

In some embodiments, the generator is further arranged to: estimate the amplitude of each of the interferer signals using time-domain correlation; and estimate the phase of each of the interferer signals using time-domain correlation. The generator may further comprise: a numerically controlled oscillator arranged to create an interference-correction signal for each frequency/amplitude/phase triplet of each interferer signal in the time domain. The generator may be further arranged to create the composite interference-correction signal in the time domain by summing the individual interference correction signals.

In some embodiments, the generator is further arranged to: create an interference-correction signal for each frequency/amplitude/phase triplets of each interference in the frequency domain; create the composite interference-correction signal in the frequency domain by summing individual interference correction signals in the frequency domain. The second processor may be further arranged to: subtract the composite frequency domain interference-correction signal from the first FFT to create a resulting signal; and forward the resulting signal for subsequent OFDM processing.

In some embodiments, the generator may be further arranged to: create an interference-correction signal for each frequency/amplitude/phase triplets of each interference in the frequency domain; and create the composite interference-correction signal in the frequency domain by summing individual interference correction signals in the frequency domain. The second generator may be further arranged to: compute a second FFT of the incoming signal; subtract the composite frequency domain interference-correction signal from the second FFT to create a resulting signal; and forward the resulting signal for subsequent OFDM processing.

In some embodiments, the apparatus may be part of a cable gateway. In other embodiments, the apparatus may be part of a wireless network, such as a UE or an evolved Node B.

Although the present invention has been described in connection with some embodiments, it is not intended to be limited to the specific form set forth herein. One skilled in the art would recognize that various features of the described embodiments might be combined in accordance with the invention. Moreover, it will be appreciated that various modifications and alterations may be made by those skilled in the art without departing from the spirit and scope of the invention.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the preceding Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

We claim:

1. A method for reducing the effect of one or more interferer signals in an orthogonal frequency division multiplexing (OFDM) system comprising:
   calculating, by a processor of a communication device, a first fast Fourier transform (FFT) of an incoming signal;
   estimating a frequency of said one or more interferer signals in the incoming signal using the first FFT of the incoming signal;
   estimating an amplitude of said one or more interferer signals in the incoming signal using the first FFT of the incoming signal;
   estimating a phase of said one or more interferer signals in the incoming signal using the first FFT of the incoming signal;
   generating, by a generator of the device, an interferer-correction signal based on the frequency, amplitude, and phase of the one or more interferer signals; and
   using the interferer-correction signal to reduce the effect of the one or more interferer signals, wherein using the interferer-correction signal comprises:
   subtracting the interferer-correction signal from the incoming signal to create a resulting signal;
   performing a second FFT on the resulting signal after subtraction of the interferer-correction signal; and
   forwarding the signal from the second FFT for subsequent OFDM processing.

2. The method of claim 1 wherein estimating the frequency of one or more interferer signals comprises:
   calculating the squared-magnitude of the FFT; and
   averaging the calculated squared-magnitude with one or more preceding FFTs by applying a non-recursive or recursive filter.

3. The method of claim 2 wherein estimating the frequency of one or more interferer signals further comprises:
   estimating the number of interferer signals; and
   estimating the frequency for each of the interferer signals.

4. The method of claim 3 wherein generating an interferer-correction signal further comprises:
   using an adaptive linear predictive algorithm to track the estimated frequency.

5. The method of claim 4 wherein generating an interferer-correction signal further comprises:
   estimating the amplitude for each of the interferer signals in the frequency domain; and
   estimating the phase of each estimated frequency/amplitude pair in the frequency domain.

6. The method of claim 5 wherein generating an interferer-correction signal further comprises:
   creating an individual interference-correction signal for each frequency/amplitude/phase triplet of each interferer signal in the time domain using a numerically controlled oscillator;
   creating the interference-correction signal in the time domain by summing the individual interference correction signals.

7. The method of claim 5 wherein generating an interferer-correction signal further comprises:
   creating an individual interference-correction signal for each frequency/amplitude/phase triplets of each interferer signal in the frequency domain; and
   creating the interference-correction signal in the frequency domain by summing individual interference-correction signals in the frequency domain; and wherein using the interferer-correction signal comprises:
   subtracting the interference-correction signal from the first FFT to create a resulting signal; and
   forwarding the resulting signal for subsequent OFDM processing.

8. The method of claim 5 wherein generating an interferer-correction signal further comprises:
   creating an individual interference-correction signal for each frequency/amplitude/phase triplets of each interferer signal in the frequency domain; and
   creating the interference-correction signal in the frequency domain by summing individual interference correction signals in the frequency domain; and
   wherein using the interferer-correction signal comprises:
   computing a second FFT of the incoming signal;
   subtracting the composite frequency domain interference-correction signal from the second FFT to create a resulting signal; and
   forwarding the resulting signal for subsequent OFDM processing.

9. The method of claim 4 wherein generating an interferer-correction signal further comprises:
   estimating the amplitude of each of the interferer signals using time-domain correlation; and
   estimating the phase of each of the interferer signals using time-domain correlation.

10. The method of claim 9 wherein generating an interferer-correction signal further comprises:
    creating an interference-correction signal for each frequency/amplitude/phase triplet of each interferer signal in the time domain using a numerically controlled oscillator; and
    creating the composite interference-correction signal in the time domain by summing the individual interference correction signals.

11. The method of claim 9 wherein generating an interferer-correction signal further comprises:
    creating an interference-correction signal for each frequency/amplitude/phase triplets of each interference in the frequency domain;
    creating the composite interference-correction signal in the frequency domain by summing individual interference correction signals in the frequency domain; and
    wherein using the interferer-correction signal comprises:
    subtracting the composite frequency domain interference-correction signal from the first FFT to create a resulting signal; and
    forwarding the resulting signal for subsequent OFDM processing.

12. The method of claim 9 wherein generating an interferer-correction signal further comprises:
    creating an interference-correction signal for each frequency/amplitude/phase triplets of each interference in the frequency domain; and creating the composite interference-correction signal in the frequency domain by summing individual interference correction signals in the frequency domain; and wherein using the interferer-correction signal comprises:
computing a second FFT of the incoming signal;
subtracting the composite frequency domain interference-correction signal from the second FFT to create a resulting signal; and
forwarding the resulting signal for subsequent OFDM processing.

13. An apparatus arranged to reduce the effect of one or more interferer signals in an orthogonal frequency division multiplexing (OFDM) system comprising:
a first processor arranged to calculate a first fast Fourier transform (FFT) of an incoming signal;
an estimator arranged to estimate a frequency of said one or more interferer signals in the incoming signal using the first FFT of the incoming signal; wherein,
the estimator is further arranged to estimate an amplitude of said one or more interferer signals in the incoming signal using the first FFT of the incoming signal; and further wherein
the estimator is further arranged to estimate a phase of said one or more interferer signals in the incoming signal using the first FFT of the incoming signal;
a generator arranged to generate an interferer-correction signal based on the frequency, amplitude, and phase of said one or more interferer signals; and
a second processor arranged to use the interferer-correction signal to reduce the effect of the one or more interferer signals, wherein the second processor comprises:
a subtractor arranged to subtract the interferer-correction signal from the incoming signal to create a resulting signal;
a transformer arranged to performing a second FFT on the resulting signal after subtraction of the interferer-correction signal; and
a forwarder arranged to forward the signal from the second FFT for subsequent OFDM processing.

14. The apparatus of claim 13 wherein the estimator further comprises:
a calculator arranged to calculate the squared-magnitude of the FFT; and
an averager arranged to average the calculated squared-magnitude with one or more preceding FFTs by applying a non-recursive or recursive filter.

15. The apparatus of claim 14 wherein the estimator is further arranged to:
estimate the number of interferer signals; and
the estimator is further arranged to estimate the frequency of each of the interferer signals.

16. The apparatus of claim 15 wherein the generator is further arranged to:
estimate the amplitude of each of the interferer signals in the frequency domain;
estimate the phase of each estimated frequency/amplitude pair in the frequency domain.

17. The apparatus of claim 16 wherein the generator is further arranged to:
create an individual interference-correction signal for each frequency/amplitude/phase triplet of each interferer signal in the time domain using a numerically controlled oscillator;
create the interference-correction signal in the time domain by summing the individual interference correction signals.

18. The apparatus of claim 16 wherein the generator is further arranged to:
create an individual interference-correction signal for each frequency/amplitude/phase triplets of each interferer signal in the frequency domain; and
create the interference-correction signal in the frequency domain by summing individual interference-correction signals in the frequency domain; and
further wherein the second processor is further arranged to:
subtract the interference-correction signal from the first FFT to create a resulting signal; and
forward the resulting signal for subsequent OFDM processing.

19. The apparatus of claim 16 wherein the generator is further arranged to:
create an individual interference-correction signal for each frequency/amplitude/phase triplets of each interferer signal in the frequency domain; and
create the interference-correction signal in the frequency domain by summing individual interference correction signals in the frequency domain; and
wherein the second processor is further arranged to:
compute a second FFT of the incoming signal;
subtract the composite frequency domain interference-correction signal from the second FFT to create a resulting signal; and
forward the resulting signal for subsequent OFDM processing.

20. The apparatus of claim 15 wherein the generator is further arranged to:
estimate the amplitude of each of the interferer signals using time-domain correlation; and
estimate the phase of each of the interferer signals using time-domain correlation.

21. The apparatus of claim 20 wherein the generator further comprises:
a numerically controlled oscillator arranged to create an interference-correction signal for each frequency/amplitude/phase triplet of each interferer signal in the time domain; and
wherein the generator is further arranged to create the composite interference-correction signal in the time domain by summing the individual interference correction signals.

22. The apparatus of claim 20 wherein the generator is further arranged to:
create an interference-correction signal for each frequency/amplitude/phase triplets of each interference in the frequency domain;
create the composite interference-correction signal in the frequency domain by summing individual interference correction signals in the frequency domain; and
wherein the second processor is further arranged to:
subtract the composite frequency domain interference-correction signal from the first FFT to create a resulting signal; and
forward the resulting signal for subsequent OFDM processing.

23. The apparatus of claim 20 wherein the generator is further arranged to:
create an interference-correction signal for each frequency/amplitude/phase triplets of each interference in the frequency domain; and
create the composite interference-correction signal in the frequency domain by summing individual interference correction signals in the frequency domain; and
wherein the second generator is further arranged to:

compute a second FFT of the incoming signal;

subtract the composite frequency domain interference-correction signal from the second FFT to create a resulting signal; and forward the resulting signal for subsequent OFDM processing.

24. The apparatus of claim 13 wherein the apparatus is contained in a cable gateway.

25. The apparatus of claim 13 wherein the apparatus is contained in a wireless system.

26. An apparatus arranged to reduce the effect of one or more interferer signals in a wireless orthogonal frequency division multiplexing (OFDM) system comprising:

a first processor arranged to calculate a first fast Fourier transform (FFT) of an incoming signal;

an estimator arranged to estimate a frequency of said one or more interferer signals in the incoming signal using the first FFT of the incoming signal; wherein, the estimator is further arranged to estimate an amplitude of said one or more interferer signals in the incoming signal using the first FFT of the incoming signal; and further wherein the estimator is further arranged to estimate a phase of said one or more interferer signals in the incoming signal using the first FFT of the incoming signal;

a generator arranged to generate an interferer-correction signal based on the frequency, amplitude, and phase of said one or more interferer signals; and a second processor arranged to use the interferer-correction signal to reduce the effect of the one or more interferer signals; wherein the second processor comprises:

a subtractor arranged to subtract the interferer-correction signal from the incoming signal to create a resulting signal;

a transformer arranged to performing a second FFT on the resulting signal after subtraction of the interferer-correction signal; and a forwarder arranged to forward the signal from the second FFT for subsequent OFDM processing.

27. The apparatus of claim 26 wherein the apparatus is located within a user equipment (UE) within a 3rd Generation Partnership Project (3GPP) Long Term Evolution (LTE) system.

28. The apparatus of claim 26 wherein the apparatus is located within an evolved Node B (eNB) within a 3GPP LTE system.

* * * * *